US011091099B1

(12) United States Patent
Shen et al.

(10) Patent No.: US 11,091,099 B1
(45) Date of Patent: Aug. 17, 2021

(54) BICYCLE CARRIER

(71) Applicant: KING ROOF INDUSTRIAL CO., LTD., Taichung (TW)

(72) Inventors: Shih-Chieh Shen, Taichung (TW); Chun-Yi Hsieh, Taichung (TW)

(73) Assignee: King Roof Industrial Co., Ltd., Taichung (TW)

( * ) Notice: Subject to any disclaimer, the term of this patent is extended or adjusted under 35 U.S.C. 154(b) by 0 days.

(21) Appl. No.: 16/934,929

(22) Filed: Jul. 21, 2020

(51) Int. Cl.
*B60R 9/00* (2006.01)
*B60R 9/10* (2006.01)
*B60R 9/06* (2006.01)
*B60R 11/00* (2006.01)

(52) U.S. Cl.
CPC ............... *B60R 9/10* (2013.01); *B60R 9/06* (2013.01); *B60R 2011/004* (2013.01); *B60R 2011/0071* (2013.01); *B60R 2011/0075* (2013.01); *B60R 2011/0085* (2013.01)

(58) Field of Classification Search
CPC ....... B60R 9/10; B60R 9/06; B60R 2011/004; B60R 2011/0071; B60R 2011/0075; B60R 2011/0085
USPC ........................................................ 224/497
See application file for complete search history.

(56) References Cited

U.S. PATENT DOCUMENTS

| 4,702,401 | A | * | 10/1987 | Graber | B60R 9/10 224/323 |
|---|---|---|---|---|---|
| 5,709,521 | A | * | 1/1998 | Glass | B60R 9/042 414/462 |
| 5,820,002 | A | * | 10/1998 | Allen | B60R 9/10 224/324 |
| 6,019,266 | A | * | 2/2000 | Johnson | B60R 9/06 224/508 |
| 6,053,336 | A | * | 4/2000 | Reeves | B62H 3/08 211/17 |
| 6,149,039 | A | * | 11/2000 | Englander | B60R 9/042 224/310 |
| 6,491,195 | B1 | * | 12/2002 | McLemore | B60R 9/06 224/521 |
| 6,523,731 | B1 | * | 2/2003 | Pedrini | B60R 9/048 224/310 |
| 6,761,297 | B1 | * | 7/2004 | Pedrini | B60R 9/10 224/324 |
| 7,815,084 | B2 | * | 10/2010 | Allen | B60R 9/06 224/537 |
| 9,096,182 | B1 | * | 8/2015 | Roth | B60R 9/06 |
| 9,555,744 | B1 | * | 1/2017 | Roth | B60R 9/06 |
| 9,649,986 | B2 | * | 5/2017 | Pedrini | B60R 9/06 |
| 10,577,040 | B1 | * | 3/2020 | Goates | B62H 3/06 |
| 2005/0061842 | A1 | * | 3/2005 | Tsai | B60R 9/06 224/501 |

(Continued)

FOREIGN PATENT DOCUMENTS

| TW | M574987 | 3/2019 |
|---|---|---|
| TW | M589137 | 1/2020 |

*Primary Examiner* — Peter N Helvey
(74) *Attorney, Agent, or Firm* — Muncy, Geissler, Olds & Lowe, P.C.

(57) ABSTRACT

A bicycle carrier is provided, including a main rod, two lateral rods, a middle rod and a base. The two lateral rods are disposed on two sides of the main rod. The base is disposed on the main rod. The middle rod is swingable and foldable relative to the base when the middle rod is pressed downwardly relative to the base.

10 Claims, 8 Drawing Sheets

(56) References Cited

U.S. PATENT DOCUMENTS

| | | | | |
|---|---|---|---|---|
| 2006/0029483 A1* | 2/2006 | Allen | ........................ | B60R 9/06 |
| | | | | 410/30 |
| 2008/0230579 A1* | 9/2008 | Wang | ........................ | B60R 9/10 |
| | | | | 224/400 |
| 2009/0120981 A1* | 5/2009 | Sautter | ..................... | B60R 9/08 |
| | | | | 224/316 |
| 2009/0120984 A1* | 5/2009 | Sautter | ..................... | B60R 9/10 |
| | | | | 224/497 |
| 2010/0320247 A1* | 12/2010 | Wang | ........................ | B60R 9/10 |
| | | | | 224/567 |
| 2011/0011909 A1* | 1/2011 | Liu | ........................... | B60R 9/10 |
| | | | | 224/501 |
| 2013/0062383 A1* | 3/2013 | Jeli | ........................... | B60R 9/10 |
| | | | | 224/497 |
| 2013/0062385 A1* | 3/2013 | Pedrini | .................... | B60R 9/06 |
| | | | | 224/501 |
| 2014/0124551 A1* | 5/2014 | Condon | .................. | B60R 9/048 |
| | | | | 224/324 |
| 2016/0068111 A1* | 3/2016 | Walker | .................... | B60R 9/06 |
| | | | | 224/521 |

* cited by examiner

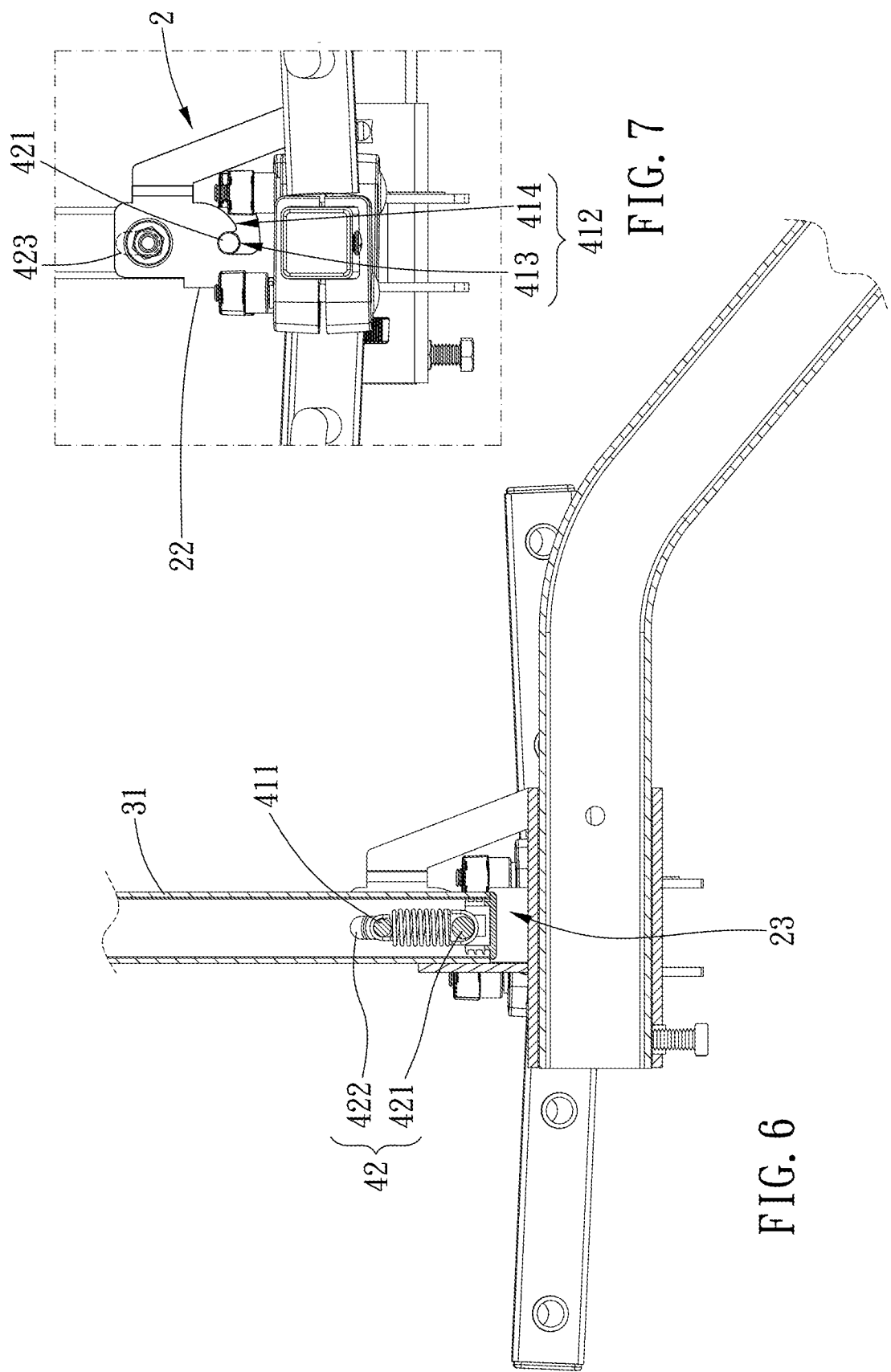

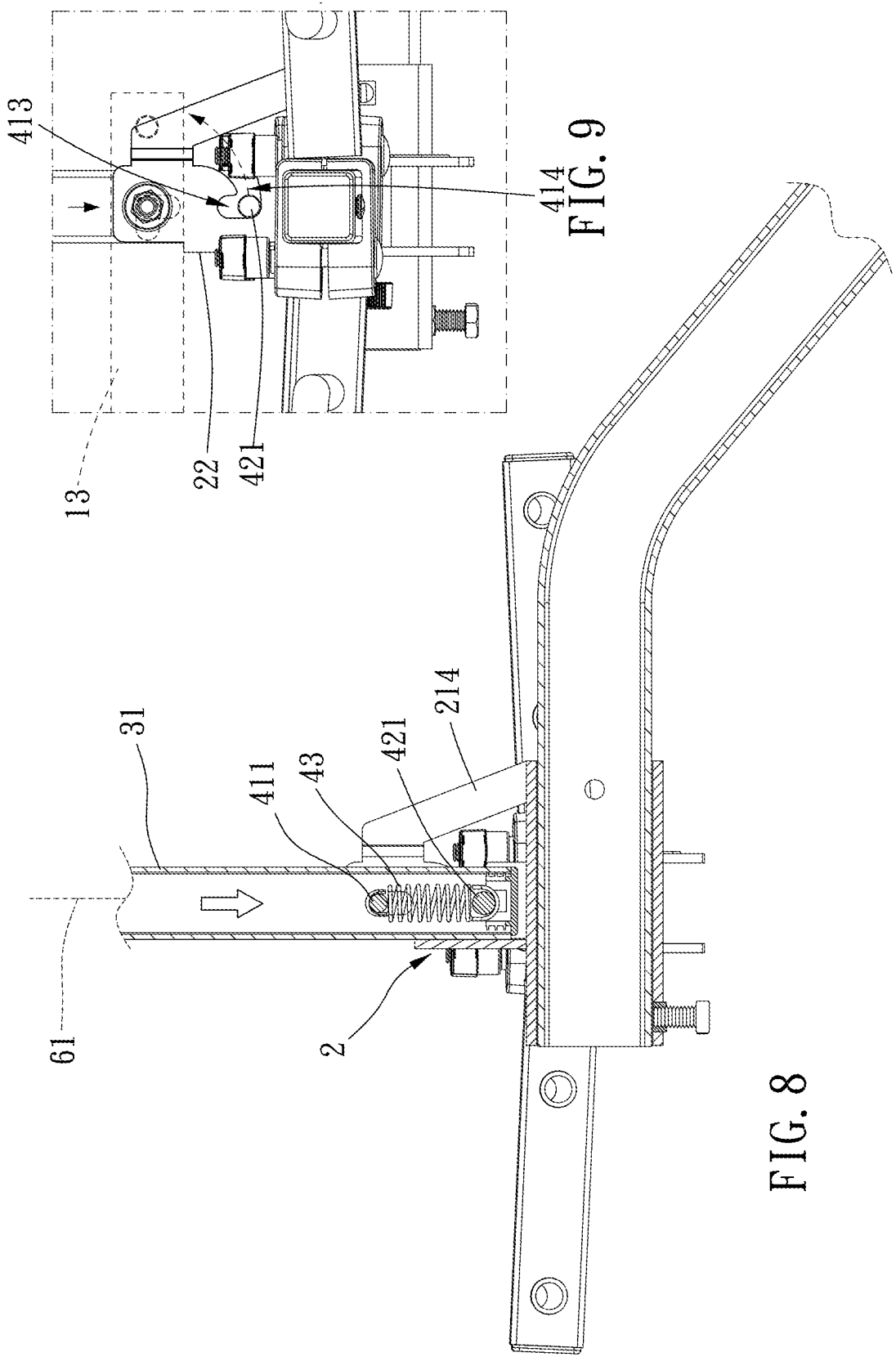

BICYCLE CARRIER

BACKGROUND OF THE INVENTION

Field of the Invention

The present invention relates to a bicycle carrier.

Description of the Prior Art

Bicycle not only can be used for commute but also has the effects of fitness and relief Many people would drive to scenic resorts on holidays, and then ride bicycles to enjoy the beautiful scenery. The demand for bicycle carriers is therefore increasing.

The structure of a towed bicycle carrier is generally as follows. A main rod is connected to the rear of a vehicle, and two support rods are provided on two opposite sides of the main rod to support wheels of the bicycle; a middle rod stands on the main rod, and a holding assembly is provided on the middle rod to hold the frame or tube of the bicycle body. This type of bicycle carrier can be found in TW D203950, TW M589137 and TW M574987.

However, after the above-mentioned bicycle carrier is assembled at the rear of the vehicle, there is a too narrow distance between the middle rod and vehicle, which makes it difficult for the bicycle to be placed between the middle rod and vehicle.

The present invention is, therefore, arisen to obviate or at least mitigate the above-mentioned disadvantages.

SUMMARY OF THE INVENTION

The main object of the present invention is to provide a bicycle carrier, in which a middle rod is easy to be unlocked and folded down for easy and quick mounting of a bicycle.

To achieve the above and other objects, a bicycle carrier is provided, including: a main rod, configured to be connected to a vehicle; two lateral rods, disposed on two opposite sides of the main rod; and a pivoting mechanism, including a base, a middle rod, a first positioning mechanism, a second positioning mechanism and an elastic member, the base disposed on the main rod, defining a longitudinal direction of the middle rod as a first direction, one of the first positioning mechanism and the second positioning mechanism being disposed on the base, the other of the first positioning mechanism and the second positioning mechanism being disposed on the middle rod, the first positioning mechanism including a first pin member and a first guiding groove, the second positioning mechanism including a second pin member and a second guiding groove, the first pin member being slidably disposed on the second guiding groove, the second pin member being slidably disposed on the first guiding groove, the first guiding groove including a first guiding slot and a second guiding slot which are in communication with each other, the first guiding slot extending in the first direction, the second guiding slot arcuately extending and lateral to the first direction, the second guiding groove being defined as a third guiding slot extending in the first direction, the elastic member being connected with the first pin member and the second pin member so that the second pin member is normally located within the first guiding slot; wherein when the middle rod is located in a first position, the second pin member is located within the first guiding slot, the middle rod is non-rotatably erect with respect to the base; when the middle rod is pressed to move downward with respect to the base in the first direction and the second pin member moves along the first guiding slot to a junction of the first guiding slot the second guiding slot, the middle rod is rotatable about the first pin member to be in a second position.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 6 is a partial cross-sectional view when the middle rod is located in the first position according to a preferable embodiment of the present invention;

FIG. 7 is a partial side view when the middle rod is located in the first position according to a preferable embodiment of the present invention;

FIG. 8 is a partial cross-sectional view when the middle rod is pressed downwardly according to a preferable embodiment of the present invention;

FIG. 9 is a partial side view when the middle rod is pressed downwardly according to a preferable embodiment of the present invention.

DETAILED DESCRIPTION OF THE PREFERRED EMBODIMENTS

Figure 1:
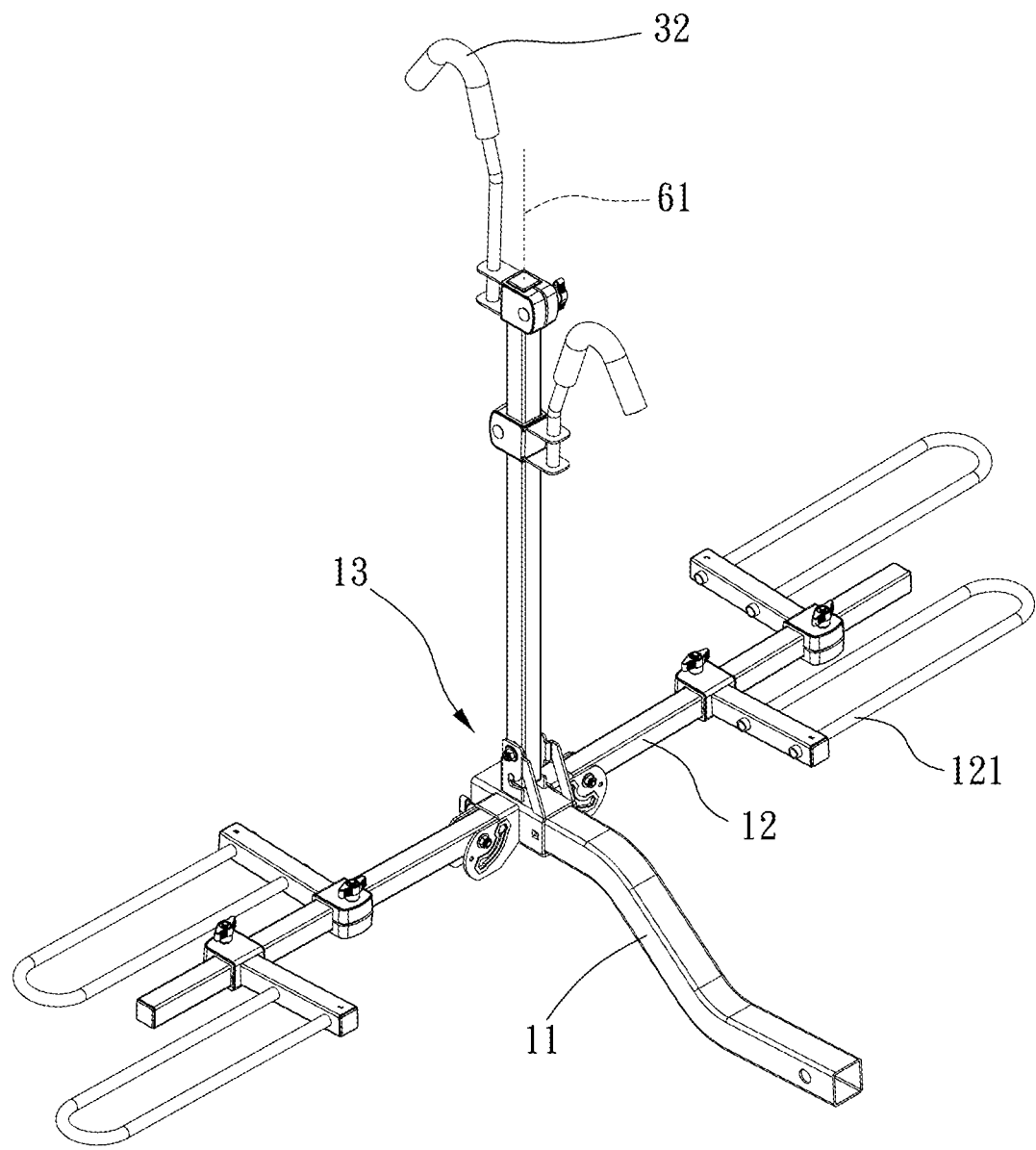
FIG. 1 is a drawing showing a middle rod located in a first position according to a preferable embodiment of the present invention.

Please refer to FIGS. 1 to 10 for a preferable embodiment of the present invention. A bicycle carrier 1 of the present invention includes a main rod 11, two lateral rods 12 and a pivoting mechanism 13.

The main rod 11 is configured to be connected to a vehicle, and the two lateral rods 12 are disposed on two opposite sides of the main rod 11. A plurality of carrying members 121 are slidably disposed on the two lateral rods 12 and configured to support a bicycle 62. The pivoting mechanism 13 includes a base 2, a middle rod 31, a first positioning mechanism 41, a second positioning mechanism 42 and an elastic member 43. The base 2 is disposed on the main rod 11, and at least one holding assembly 32 is adjustably disposed on the middle rod 31 and configured to hold the bicycle 62.

A longitudinal direction of the middle rod 31 is defined as a first direction 61. One of the first positioning mechanism 41 and the second positioning mechanism 42 is disposed on the base 2, and the other of the first positioning mechanism 41 and the second positioning mechanism 42 is disposed on the middle rod 31. The first positioning mechanism 41 includes a first pin member 411 and a first guiding groove 412, and the second positioning mechanism 42 includes a second pin member 421 and a second guiding groove 422. The first pin member 411 is slidably disposed on the second guiding groove 422, and the second pin member 421 is slidably disposed on the first guiding groove 412. The first guiding groove 412 includes a first guiding slot 413 and a second guiding slot 414 which are in communication with each other, the first guiding slot 413 extends in the first direction 61, and the second guiding slot 414 arcuately extends lateral to the first direction 61. The second guiding groove 422 is defined as a third guiding slot 423 extending in the first direction 61. The elastic member 43 is connected with the first pin member 411 and the second pin member 421 so that the second pin member 421 is normally located within the first guiding slot 413.

Figure 2:
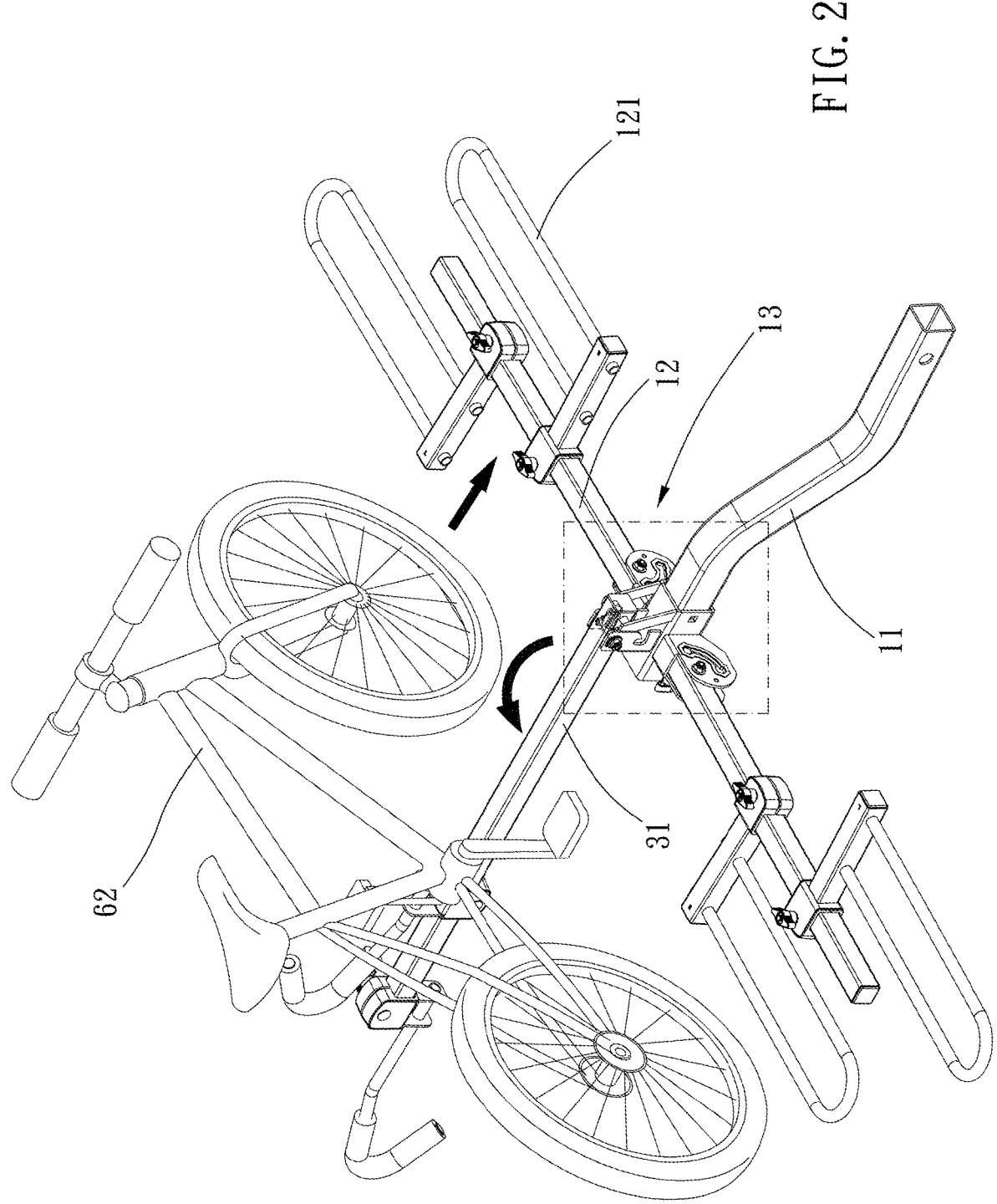
FIG. 2 is a drawing showing the middle rod located in a second position according to a preferable embodiment of the present invention.
Figure 3:
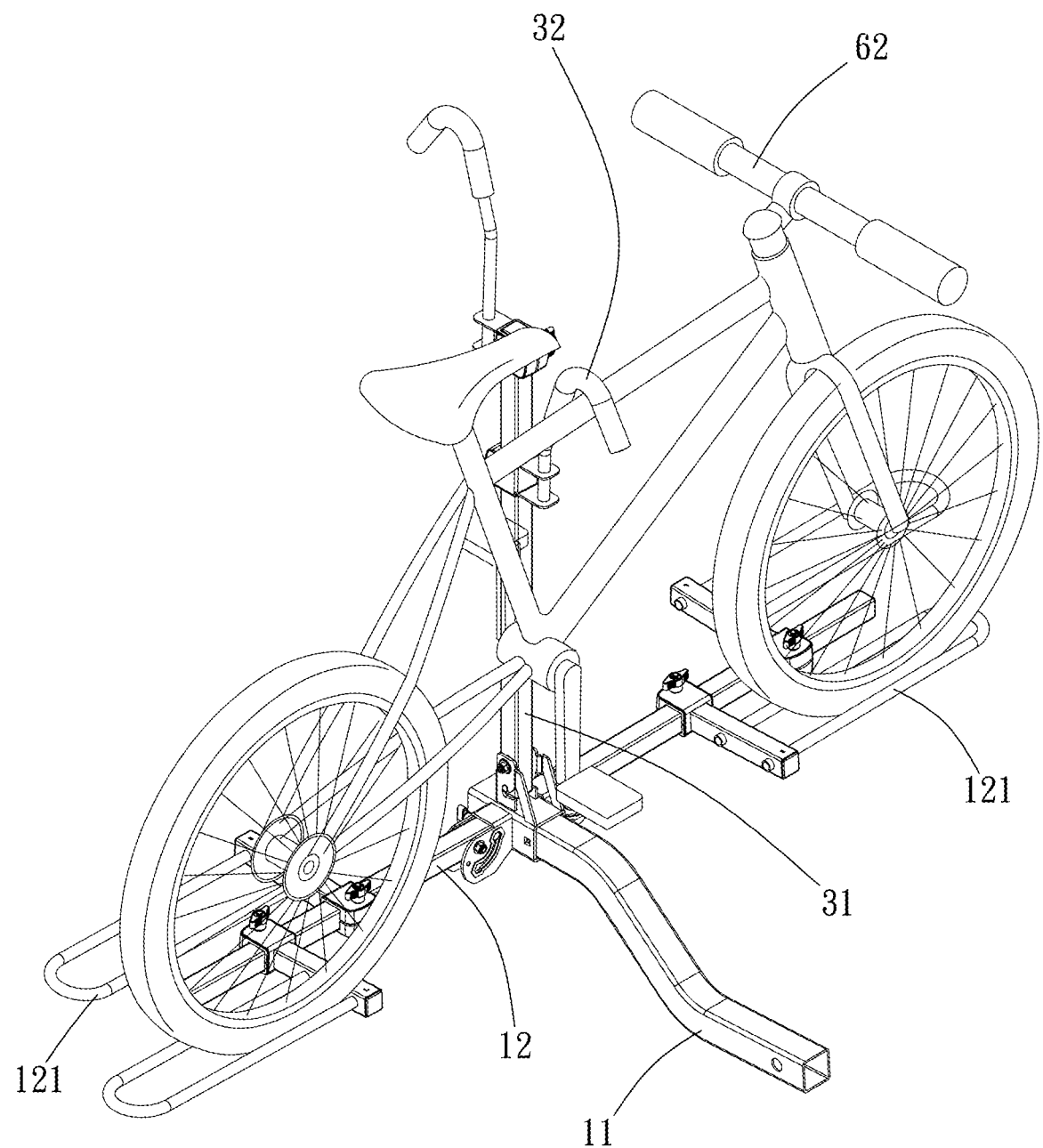
FIG. 3 is a stereogram of a preferable embodiment of the present invention in use.
Figure 4:
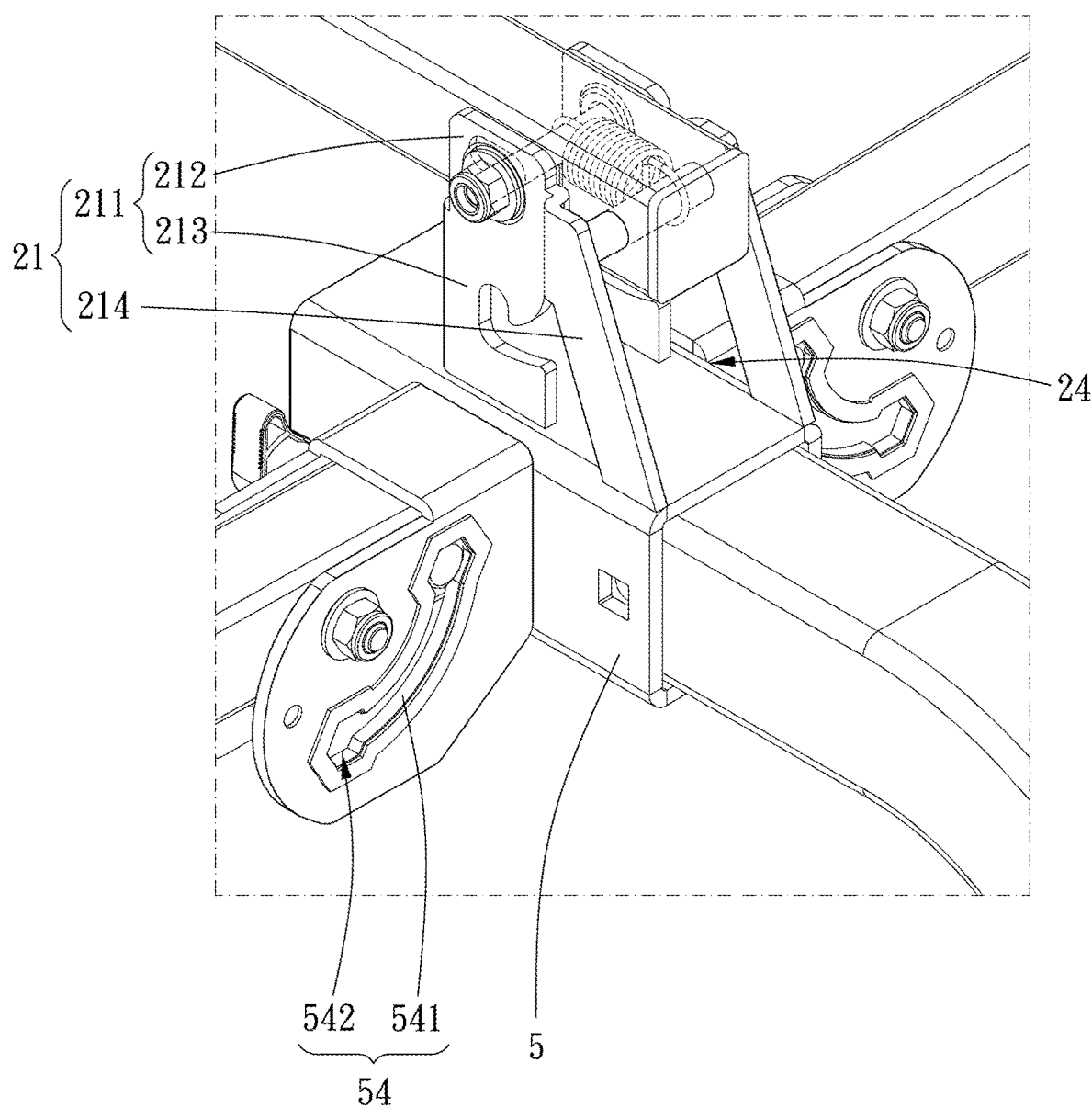
FIG. 4 is a partial enlargement of FIG. 2.
Figure 5:
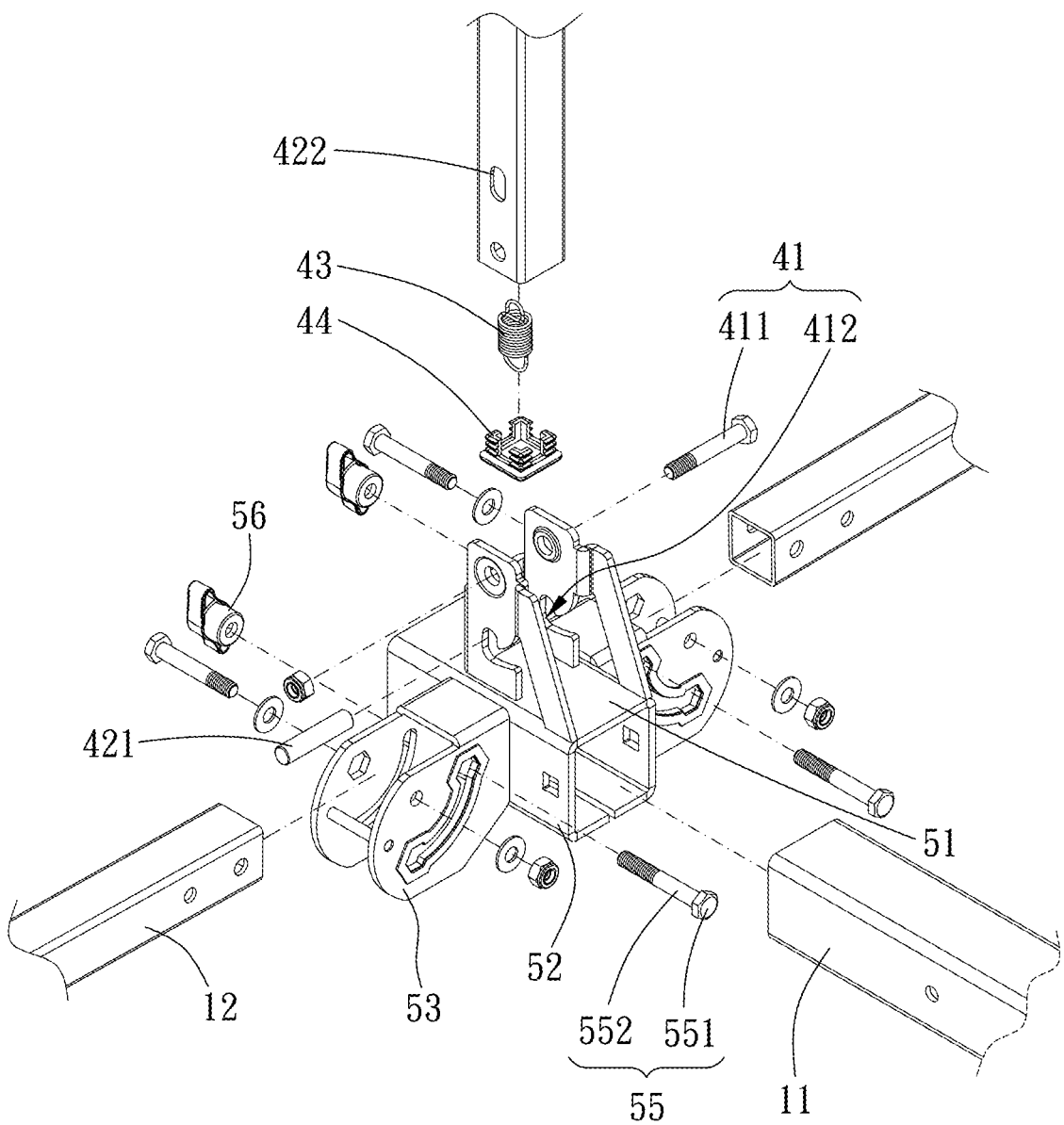
FIG. 5 is a breakdown drawing according to FIG. 4.
Figure 10:
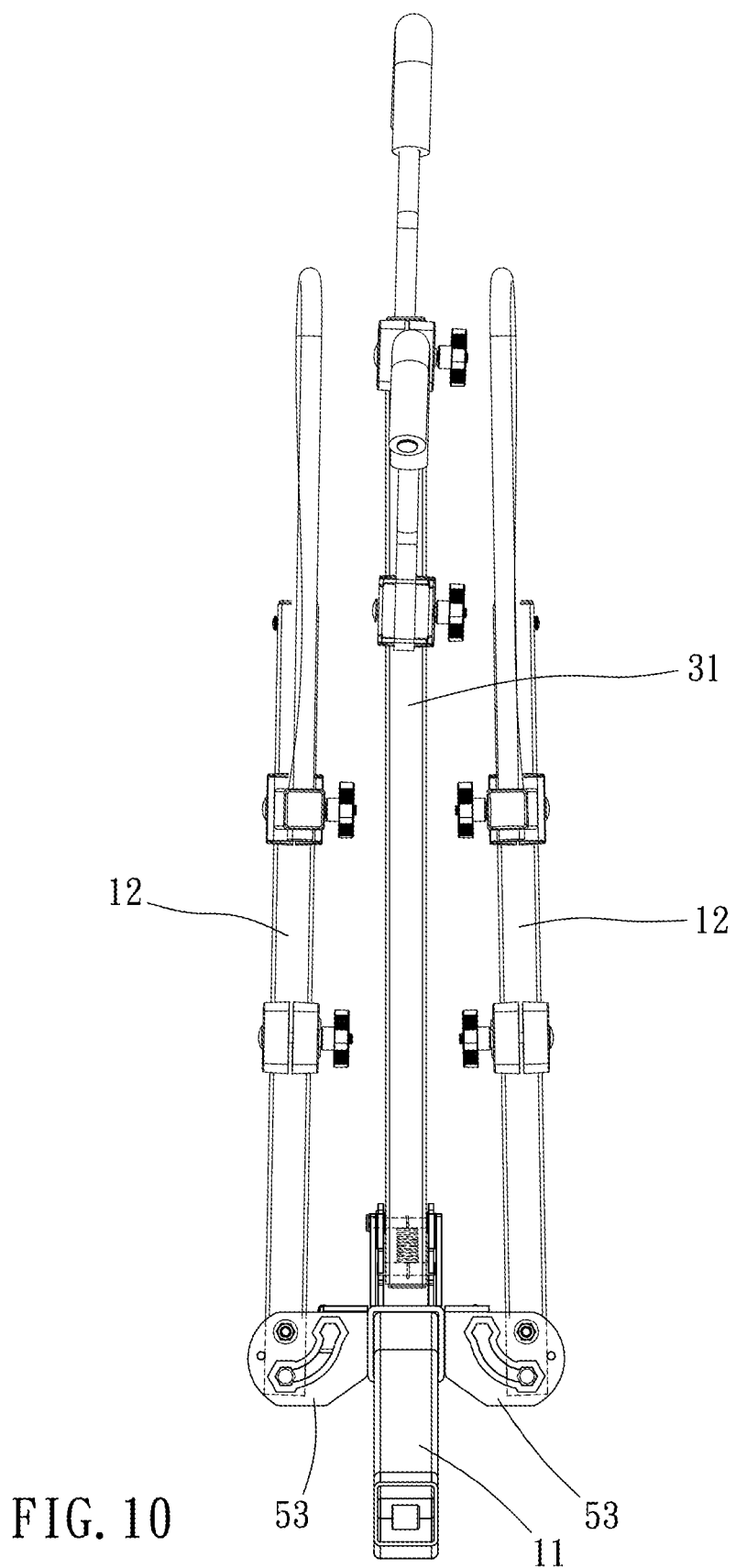
FIG. 10 is a drawing showing two lateral rods folded to be close to the middle rod according to a preferable embodiment of the present invention.

As shown in FIGS. 6 and 7, when the middle rod 31 is located in a first position, the second pin member 421 is located within the first guiding slot 413, and the middle rod 31 is non-rotatably erect with respect to the base 2, which cooperates with the at least one holding assembly 32 for holding the bicycle 62 (FIG. 3); as shown in FIGS. 8 and 9, when the middle rod 31 is pressed to move downward with respect to the base 2 in the first direction 61 and the second pin member 421 moves along the first guiding slot 413 to a junction of the first guiding slot 413 and the second guiding slot 414, the middle rod 31 is rotatable about the first pin member 411 to be in a second position; as shown in FIGS. 2 and 3, as the middle rod 31 is located in the second position, the middle rod 31 is folded down so that the bicycle 62 can be placed on the carrying members 121 near the vehicle quickly and easily. The middle rod 31 can be unlocked simply by pressing the middle rod 31. For example, user can unlock the middle rod 31 as he stands upright.

In this embodiment, the first positioning mechanism 41 is disposed on the base 2, the second positioning mechanism 42 is disposed on the middle rod 31, the first pin member 411 is disposed through the base 2, the second guiding groove 422 and the middle rod 31, the second pin member 421 is disposed through the middle rod 31 and extends within the first guiding groove 412, and the first guiding groove 412 is located between the first pin member 411 and the main rod 11.

Preferably, the second guiding slot 414 is in communication with the first guiding slot 413, and the second pin member 421 is movable out from or into the first guiding groove 412 via the second guiding slot 414, which provides large range for swinging of the middle rod 31, shortens the length of the second guiding slot 414, and simplifies processing steps.

Preferably, the elastic member 43 is located within the middle rod 31, which can avoids affection to the elastic member 43.

Preferably, a plug 44 is plugged within the middle rod 31 and covers one end of the middle rod 31, which can blocks out foreign matter such as dust, bugs or the like.

The base 2 includes two side walls 21 and a supporting wall 22. Specifically, the two side walls 21 are identical, symmetrically arranged and separate from each other. Each said side wall 21 includes an upper portion 212 and a lower portion 213 connected with the upper portion 212, and the supporting wall 22 is transversely connected between the two lower portions 213 to define an insertion space 23 and an opening 24 which are in communication with each other. The first pin member 411 is positioned at the upper portion 212, and the first guiding groove 412 is disposed on the lower portion 213. A portion of the middle rod 31 at which the second positioning mechanism 42 is disposed is inserted within the insertion space 23. When the middle rod 31 swings to be in the second position, the middle rod 31 is abutted against the supporting wall 22, wherein the supporting wall 22 can provide good support to the middle rod 31 so that the middle rod 31 is stable when folded down.

Specifically, the middle rod 31 is disposed between the two side walls 21, and the second guiding groove 422 is entirely shielded by the two side walls 21 as the middle rod 31 is located in the first position or during rotation of the middle rod 31, which can prevent entering of foreign matters into the middle rod 31 via the second guiding groove 422. The middle rod 31 is a square rod, and a length of the second guiding groove 422 is shorter than a width of the middle rod 31.

In this embodiment, the two side walls 21 each further include a main board 211 and an enforcing board 214, the main board 211 includes the upper portion 212 and the lower portion 213, and the enforcing board 214 is tiltedly connected to the main board 211. A distance between the main boards 211 of the two side walls 21 is smaller than a distance between the enforcing boards 214 of the two side walls 21. When the second pin member 421 is disengaged from the second guiding slot 414, two ends of the second pin member 421 are slidably abutted against the enforcing boards 214 of the two side walls 21. Through abutment of the enforcing boards 214 against the second pin member 421, it can effectively buffer swinging of the middle rod 31 and avoid external impact.

The bicycle carrier further includes a sleeve member 5 detachably sleeved around the main rod 11. The two lateral rods 12 are respectively disposed on two side portions 52 of the sleeve member 5, the pivoting mechanism 13 is disposed on a top portion 51 of the sleeve member 5, and the top portion 51 is connected between the two side portions 52. Relative to the top portion 51 of the sleeve member 5, a ratio of a height of each said side wall 21 and the length of the second guiding groove 422 is at least greater than 4.

The two lateral rods 12 are swingably and respectively disposed on two side portions 52 of the sleeve member 5, for folding. Specifically, two pivot seats 53 are respectively disposed on the two side portions 52 of the sleeve member 5. Each said pivot seat 53 includes a fourth guiding groove 54 therethrough, and the fourth guiding groove 54 includes a sliding section 541 and two locking sections 542 which are in communication with the sliding section 541. The sliding section 541 extends arcuately, and the two locking sections 542 are respectively disposed on two ends of the sliding section 541. Each said locking section 542 is wider than each said sliding section 541. A first member 55 is disposed through one said lateral rod 12 and slidably engaged within the fourth guiding groove 54, and a second member 56 is movably screwed with the first member 55 so that the first member 55 is partially protrudable beyond the fourth guiding groove 54. Specifically, the first member 55 includes an enlarged portion 551 and a body portion 552 connected with the enlarged portion 551, the second member 56 is screwed with the body portion 552, and the body portion 552 is slidable along the fourth guiding groove 54. The enlarged portion 551 is engageable with or disengageable from one said locking section 542. The enlarged portion 551 is preferably wider than the sliding section 541.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle carrier, including:

a main rod, configured to be connected to a vehicle;

two lateral rods, disposed on two opposite sides of the main rod; and a pivoting mechanism, including a base, a middle rod, a first positioning mechanism, a second positioning mechanism and an elastic member, the base disposed on the main rod, defining a longitudinal direction of the middle rod as a first direction, one of the first positioning mechanism and the second positioning mechanism being disposed on the base, the other of the first positioning mechanism and the second positioning mechanism being disposed on the middle rod, the first positioning mechanism including a first pin member and a first guiding groove, the second positioning mechanism including a second pin member and a second guiding groove, the first pin member being slidably disposed on the second guiding groove, the second pin member being slidably disposed on the first guiding groove, the first guiding groove including a first guiding slot and a second guiding slot which are in communication with each other, the first guiding slot extending in the first direction, the second guiding slot arcuately extending and lateral to the first direction, the second guiding groove being defined as a third guiding slot extending in the first direction, the elastic member being connected with the first pin member and the second pin member so that the second pin member is normally located within the first guiding slot;

wherein when the middle rod is located in a first position, the second pin member is located within the first guiding slot, the middle rod is non-rotatably erect with respect to the base; when the middle rod is pressed to move downward with respect to the base in the first direction and the second pin member moves along the first guiding slot to a junction of the first guiding slot the second guiding slot, the middle rod is rotatable about the first pin member to be in a second position.

2. The bicycle carrier of claim 1, wherein the first positioning mechanism is disposed on the base, the second positioning mechanism is disposed on the middle rod, the first pin member is disposed through the base, the second guiding groove and the middle rod, the second pin member is disposed through the middle rod and extends within the first guiding groove, and the first guiding groove is located between the first pin member and the main rod.

3. The bicycle carrier of claim 2, wherein the elastic member is located within the middle rod.

4. The bicycle carrier of claim 2, wherein the second guiding slot is in communication with the first guiding slot, and the second pin member is movable out from or into the first guiding groove via the second guiding slot.

5. The bicycle carrier of claim 4, wherein the base includes two side walls and a supporting wall, the two side walls are identical, symmetrically arranged and separate from each other, each said side wall includes an upper portion and a lower portion connected with the upper portion, the supporting wall is transversely connected between the two lower portions to define an insertion space and an opening which are in communication with each other, the first pin member is positioned at the upper portion, the first guiding groove is disposed on the lower portion, a portion of the middle rod at which the second positioning mechanism is disposed is inserted within the insertion space, and when the middle rod swings to be in the second position, the middle rod is abutted against the supporting wall.

6. The bicycle carrier of claim 5, wherein the middle rod is disposed between the two side walls, and the second guiding groove is entirely shielded by the two side walls as the middle rod is located in the first position or during rotation of the middle rod.

7. The bicycle carrier of claim 1, further including a sleeve member detachably sleeved around the main rod, wherein the two lateral rods are respectively disposed on two side portions of the sleeve member, the pivoting mechanism is disposed on a top portion of the sleeve member, and the top portion is connected between the two side portions.

8. The bicycle carrier of claim 7, wherein the two lateral rods are swingably and respectively disposed on two side portions of the sleeve member.

9. The bicycle carrier of claim 8, wherein two pivot seats are respectively disposed on two side portions of the sleeve member, each said pivot seat includes a fourth guiding groove therethrough, the fourth guiding groove includes a sliding section and two locking sections which are in communication with each other, the sliding section extends arcuately, the two locking sections are respectively disposed on two ends of the sliding section, each said locking section is wider than each said sliding section, a first member is disposed through one said lateral rod and slidably engaged within the fourth guiding groove, a second member is movably screwed with the first member so that the first member is partially protrudable beyond the fourth guiding groove; the first member includes an enlarged portion and a body portion connected with the enlarged portion, the second member is screwed with the body portion, the body portion is slidable along the fourth guiding groove, the enlarged portion is engageable with or disengageable from one said locking section, and the enlarged portion is wider than the sliding section.

10. The bicycle carrier of claim 6, wherein the elastic member is located within the middle rod; the bicycle carrier further includes a sleeve member detachably sleeved around the main rod, the two lateral rods are respectively disposed on two side portions of the sleeve member, the pivoting mechanism is disposed on a top portion of the sleeve member, and the top portion is connected between the two side portions; the two lateral rods are swingably and respectively disposed on two side portions of the sleeve member; two pivot seats are respectively disposed on the two side portions of the sleeve member, each said pivot seat includes a fourth guiding groove therethrough, the fourth guiding groove includes a sliding section and two locking sections which are in communication with the sliding section, the sliding section extends arcuately, the two locking sections are respectively disposed on two ends of the sliding section, each said locking section is wider than each said sliding section, a first member is disposed through one said lateral rod and slidably engaged within the fourth guiding groove, a second member is movably screwed with the first member so that the first member is partially protrudable beyond the fourth guiding groove; the first member includes an enlarged portion and a body portion connected with the enlarged portion, the second member is screwed with the body portion, the body portion is slidable along the fourth guiding groove, the enlarged portion is engageable with or disengageable from one said locking section, and the enlarged portion is wider than the sliding section; the middle rod is a square rod, a length of the second guiding groove is shorter than a width of the middle rod; relative to the top portion of the sleeve member, a ratio of a height of each said side wall and the length of the second guiding groove is at least greater than 4; a plug is plugged within and covers one end of the middle rod; a plurality of carrying members are slidably disposed on the two lateral rods and configured to support a bicycle; at least one holding assembly is adjustably disposed on the middle rod and configured to hold the bicycle; the two side walls each further include a main board and an enforcing board, the main board includes the upper portion and the lower portion, the enforcing board is tiltedly connected to the main board, a distance between the main boards of the two side walls is smaller than a distance between the enforcing boards of the two side walls, and when the second pin member is disengaged from the second guiding slot, two ends of the second pin member are slidably abutted against the enforcing boards of the two side walls, respectively.

\* \* \* \* \*